(12) United States Patent
Erskine

(10) Patent No.: US 6,239,813 B1
(45) Date of Patent: May 29, 2001

(54) METHOD OF DEFINING A COMPUTER-GENERATED INTELLIGENT SYMBOL

(76) Inventor: Timothy Joseph Erskine, 1160 E. Stone Valley Way, Sandy, UT (US) 84094

( * ) Notice: Subject to any disclaimer, the term of this patent is extended or adjusted under 35 U.S.C. 154(b) by 0 days.

(21) Appl. No.: 09/233,967

(22) Filed: Jan. 20, 1999

(51) Int. Cl.[7] ............ G06T 11/20; G06F 17/50
(52) U.S. Cl. ............................ 345/440; 345/441
(58) Field of Search ..................... 345/441, 440

(56) References Cited

U.S. PATENT DOCUMENTS

| | | |
|---|---|---|
| 4,875,865 | 10/1989 | Kato et al. . |
| 4,933,865 | 6/1990 | Yamamoto et al. . |
| 5,265,197 * | 11/1993 | Kondo ........................ 345/441 |
| 5,297,254 | 3/1994 | Arai et al. . |
| 5,299,307 * | 3/1994 | Young ......................... 345/441 |
| 5,408,601 | 4/1995 | Nakamura et al. . |
| 5,430,837 * | 7/1995 | Matsuo ....................... 345/441 |
| 5,465,324 | 11/1995 | Lee et al. . |
| 5,572,639 | 11/1996 | Gantt . |
| 5,634,093 | 5/1997 | Ashida et al. . |
| 5,640,499 | 6/1997 | Nagai . |
| 5,664,083 | 9/1997 | Takeuchi et al. . |
| 5,673,421 * | 9/1997 | Shirakawa ................... 345/441 |
| 5,754,842 | 5/1998 | Minagawa . |
| 5,764,936 | 6/1998 | Evans et al. . |
| 5,793,377 | 8/1998 | Moore . |
| 5,943,062 | 8/1999 | Schanel . |
| 5,977,988 | 11/1999 | Greene . |
| 6,002,399 * | 12/1999 | Haine et al. ................ 345/348 |
| 6,154,220 * | 11/2000 | Prakriya et al. ............. 345/440 |
| 6,161,078 * | 12/2000 | Ganley ........................ 345/440 |

OTHER PUBLICATIONS

Visio Corporation, "Developing Visio Solutions: version 5.0", Seattle: Visio Corporation, pp. iii–xiii, 79–87, 99–109, Aug. 1997.*

Corel Corporation, "Corel Flow: user manual", Corel, pp. i–v, 30–31, 38–39, 116, index 1–index 5, unknown.*

Code Zebra, Inc., "FlowTools: using FlowTools", pp. I–IV, 23–34, 59, index, Dec. 1995.*

Visio Corporation, "Using Visio Products 5.0: users manual", pp. iv–vii, 29–29–34, 65–72, 74, index, Aug. 1997.*

* cited by examiner

Primary Examiner—Mark R. Powell
Assistant Examiner—Jeffrey Allen Rossi
(74) Attorney, Agent, or Firm—Michael Schwarz

(57) ABSTRACT

In a computer aided design system, an intelligent symbol is made up of graphical entities. Connectors join the entities to other entities at connection points. When the symbol is moved, the connectivity between entities must be maintained. A connection point positioning symbol is generated, forming part of a definition of the intelligent symbol. The connection point positioning symbol has a position and an angle which describe the connection point. The connection point positioning symbol can be displayed and then hidden from view. The connection point positioning symbol allows the user to edit a connection to the intelligent symbol.

31 Claims, 5 Drawing Sheets

METHOD OF DEFINING A COMPUTER-GENERATED INTELLIGENT SYMBOL

BACKGROUND

This invention relates generally to the field of software for Computer Aided Design, or "CAD." More specifically, it relates to software for use in a CAD system for creating two-dimensional diagrams, including but not limited to flow charts, electrical schematics, plant processes and the like.

In CAD systems, diagrams most often consist of representational graphical objects or symbols interconnected by straight, curved or serpentine lines, chains of lines, or other shapes such as arrows which illustrate the connectivity between symbols. Examples of such diagrams are electronic circuit diagrams or computer flow charts. Some kinds of diagrams, such as architectural space plans, do not require connecting lines and symbols may be connected directly to each other. The symbols are made up of individual graphical entities, such as lines, circles, arcs, text and images. Different software companies may refer to symbols using terminology such as "blocks" or "shapes."

Software is widely available which automates the manipulation and interconnection of symbols, so that when an operator changes the position or other parameter of a symbol, all connections and/or symbols associated with that symbol reconfigure themselves to maintain that association. Such software is available from Visio Corp. under the name "Visio Technical". Complex connections can be created between symbols by simply picking start and end points. Symbols and connections which provide this automatic behavior are referred to as "intelligent," or "smart" symbols and connections.

Part of the definition of an intelligent symbol is made up of the locations of the connection points to which intelligent connections are to be attached. Existing graphical methods of displaying connection point locations for symbols on intelligent diagrams consist of a small symbol, such as an "X" which appears at each connection point location. These connection point symbols must be kept relatively small in order to prevent screen clutter, and are difficult to select and manipulate. Existing methods are therefore very cumbersome and do not permit easy editing of symbols, especially in cases where connectivity is relatively complex.

The present invention provides an efficient and easy-to-use method of defining and manipulating an intelligent symbol which facilitates the editing of symbols so that connections between symbols can be readily added and edited.

SUMMARY OF THE INVENTION

The present invention, to be used in a computer aided design system, is a method of defining an intelligent symbol. The method comprises the steps of defining a computer-generated symbol which is made up of a graphical entity and a connection point having a position in relation to a reference point. A connection point positioning symbol associated with the computer-generated symbol is defined. The connection point positioning symbol has a location and an angle. The coordinates of the location of the connection point positioning symbol are generated. These coordinates describe the position of the connection point in relation to a reference point. The angle of the connection point positioning symbol is generated. This angle describes a direction of the connection point positioning symbol in relation to a reference angle. A symbol definition for the computer-generated symbol is thus built. The definition comprises the coordinates of the location of the connection point positioning symbol and the angle of the connection point positioning symbol.

The present invention also comprises a method of editing an intelligent symbol by defining a connection point positioning symbol which indicates the angle and location of a connection to the intelligent symbol.

DETAILED DESCRIPTION OF THE PREFERRED EMBODIMENT

The following is a description of the preferred embodiment of the invention. It is intended to be illustrative and not limiting. The full scope of the invention is to be determined by reference to the claims and their equivalents.

The following is a list of terms used throughout this description: Entity: data defining a graphical object, such as a line, circle, text, etc. which forms part of a symbol. Elements 13 and 14 are examples of entities in FIG. 2A.

Figure 2E:
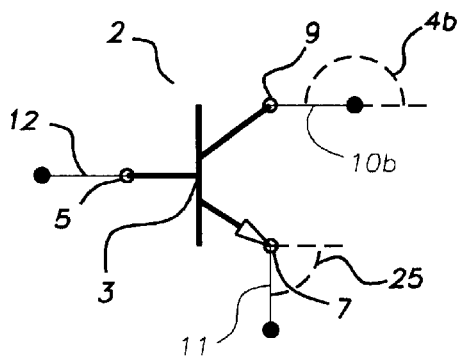
FIG. 2E shows the editing of a connection point positioning symbol and the addition of a new connection point positioning symbol.
Figure 2F:
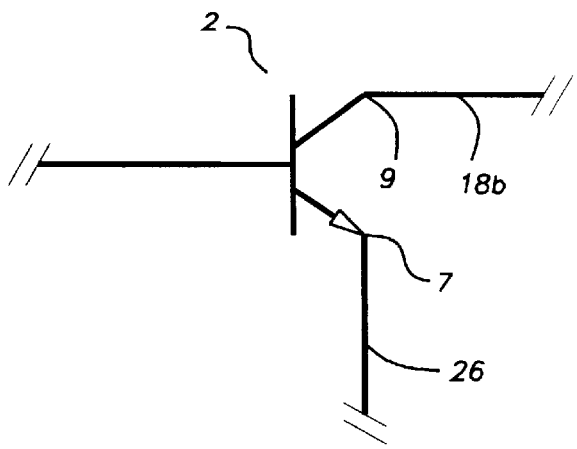
FIG. 2F shows an intelligent symbol with connectors changed using the present invention and with the connection point positioning symbols hidden.

Symbol: a collection of entities which can be manipulated as a single object. Symbol 2 in FIG. 2A is an example of a symbol which contains entities 13 and 14.

Figure 2A:
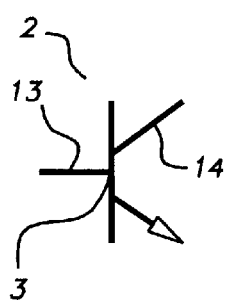
FIG. 2A shows the basic structure of an intelligent symbol of the prior art.
Figure 3:
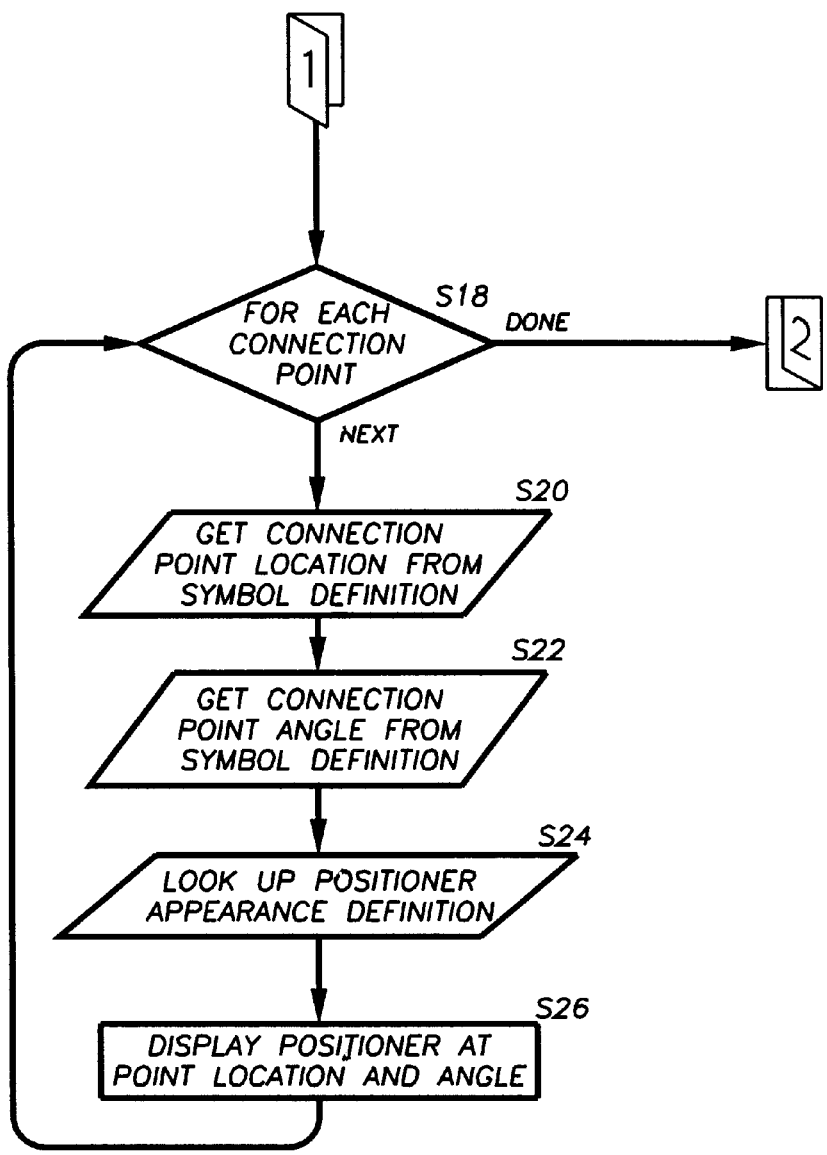
FIG. 3 is a flow chart which shows the preferred method for generating connection point positioning symbols for the connection point(s) of an intelligent symbol.

Symbol origin: the reference point from which the symbol entities are measured, typically at 0,0 on an X, Y coordinate system. In FIG. 2A, 3 indicates the origin of symbol 2.

Connector: An object which shows a graphical association between symbols. In FIG. 2B, 18a and 22 are connectors.

Connection point: A point on a symbol at which a connector joins to the symbol so that the symbol can be connected to one or more other symbols. In FIG. 2B, points 9 and 5 are connection points. Symbols can also be connected directly to other symbols at connection points.

The preferred embodiment of the invention will now be described with reference to the flow chart of FIG. 1 and FIGS. 2A–F. The method is practiced using a suitably programmed digital computer, it being recognized that this description will enable a person of ordinary skill in the art to implement the invention in suitable computer code.

An intelligent symbol is shown in FIG. 2A. This symbol is defined to include graphical entities 13 and 14 and origin 3. The symbol definition also includes connection points 5 and 9. FIG. 2B shows connector 18a connected to entity 14 and connector 22 connected to entity 13. As shown in FIG. 2B, connector 18a is connected to entity 14 at connection point 9 which has a position defined relative to the origin 3. Connector 22 is connected to entity 13 at connection point 5 which also has a position defined relative to origin 3. Connector 18a forms an angle 4a at connection point 9 relative to reference angle 16. Similarly connector 22 forms an angle 6 at connection point 5. Symbol 2 is defined in terms of data representing the items just described, preferably but not necessarily including angle data. The connection points can of course be defined relative to any convenient reference point, can be at any location, and may or may not be related to a graphical entity of the intelligent symbol.

Figure 1:
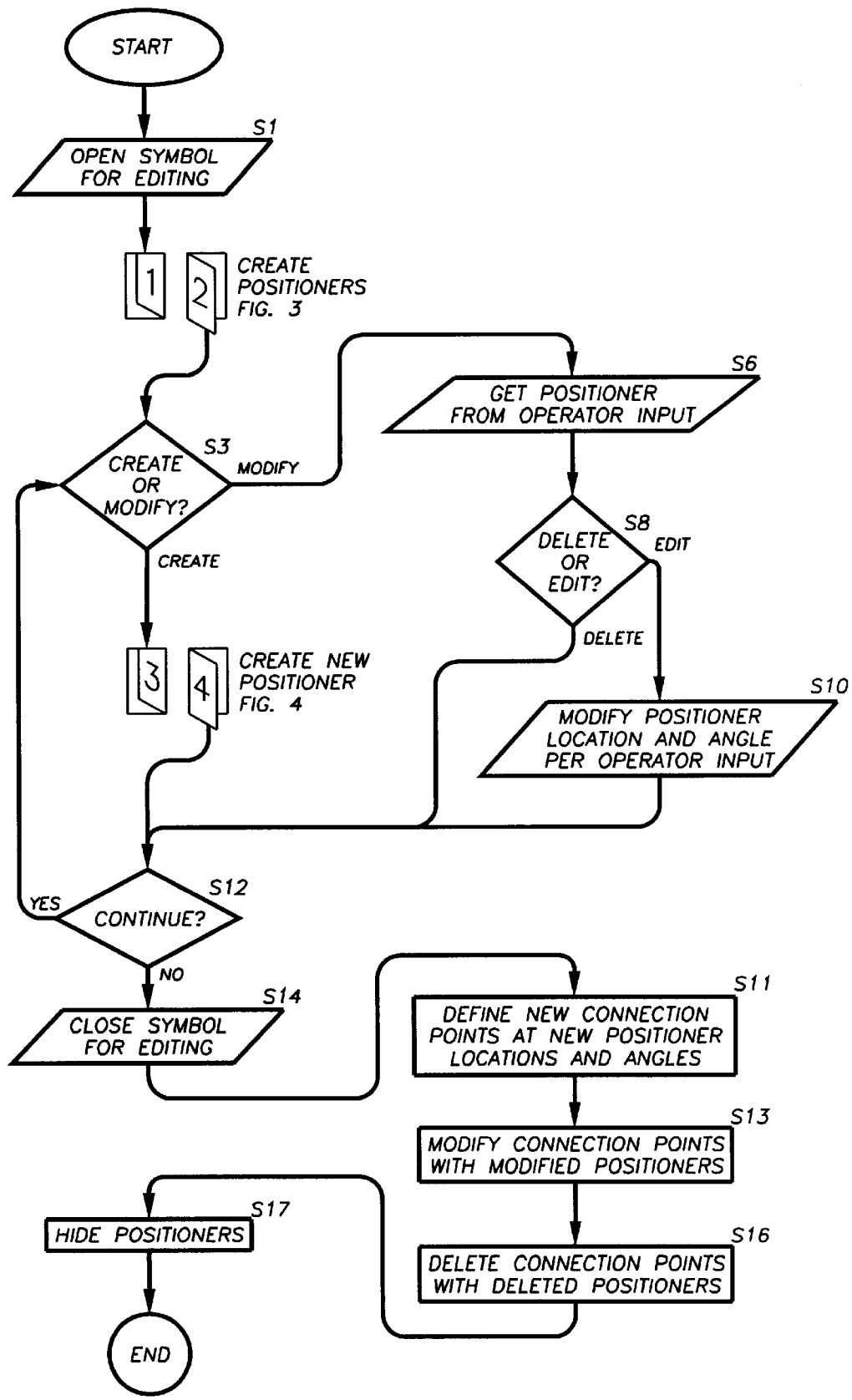
FIG. 1 is a flow chart showing the preferred method for using connection point positioning symbols to define connection points for intelligent symbols.

Now, referring to FIG. 1, it is assumed that symbol 2 has been defined in the manner described above. The operator opens symbol 2 for editing at S1. Different software programs provide editing for symbols in different ways. In general, editing comprises the ability by the operator to add, remove or modify symbol connection points.

The program now branches to step S18 shown in FIG. 3. At step S18 each connection point in the definition of intelligent symbol 2 is processed in accordance with steps S20 through S26 and a connection point positioning symbol (referred to as a "positioner" in the figures) is generated. Consider for purposes of illustration, connection point 9 (see FIG. 2B). At step S20, the location of connection point 9 (see FIG. 2C) is determined with respect to symbol origin 3. The location of connection point 9 is previously stored as part of the definition of symbol 2. At step S22, the angle of the connection point—angle 4a—(see FIG. 2B) is determined with respect to reference angle 16. Preferably, angle 4a is also previously stored as part of the definition of symbol 2. Alternatively, angle 4a can be determined from another geometric relationship, for example, from the angle of connector 18a attached to connection point 9, or from the position of connection point 9 with respect to symbol origin 3, or from the size boundaries of symbol 2.

At step S24, the program looks up the definition of the appearance of the connection point positioning symbol. The general appearance of a connection point positioning symbol is pre-stored and determined by the application software. In the preferred embodiment, the connection point positioning symbol is made up of a first end 19 to be located at a connection point and a second end having a dot or handle 17. The line between first end 19 and handle 17 forms angle 21 relative to a reference angle. This is shown in FIG. 2D.

Figure 2C:
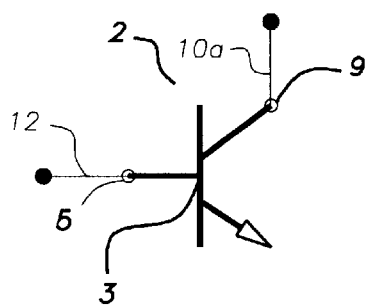
FIG. 2C shows an intelligent symbol with added connection point positioning symbols of the present invention.
Figure 2D:
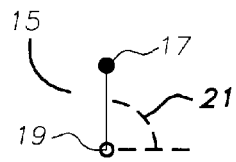
FIG. 2D shows a connection point positioning symbol of the present invention.
Figure 2B:
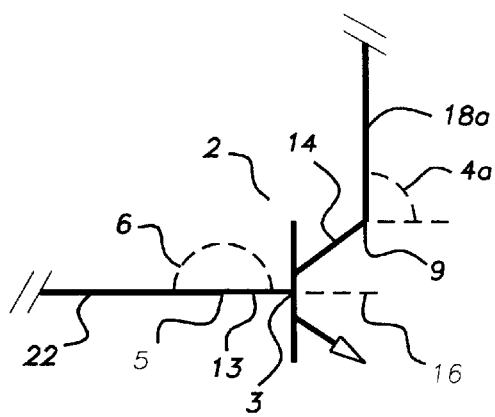
FIG. 2B shows an intelligent symbol with connectors which allow it to be connected to other symbols.

Referring now to step S26 in FIG. 3 and to FIG. 2C, connection point positioning symbol 10a is displayed at connection point 9, making angle 4a which describes the direction of the connection point positioning symbol relative to reference angle 16 (but any convenient reference angle can be used). The coordinates of the location of the connection point positioning symbol are taken to be the coordinates of the location of first end 19 relative to origin 3 (but any convenient origin can be used). Thus a connection point positioning symbol having an angle and a location is defined for a particular connection point 9 and displayed. Steps S20 through S26 are then repeated for each remaining connection point defined for the symbol. The flow chart now returns to step S3 in FIG. 1.

In the preferred embodiment of the invention, the connection point positioning symbols for every connection point are displayed simultaneously during editing. However, in an alternative embodiment, connection point positioning symbols are displayed only while they are being modified or created. In that case, when the operator selects a connection point to modify, the connection point positioning symbol for that connection point is displayed. The other connection point positioning symbols remain hidden.

Once symbol 2 is opened for editing and the connection point positioning symbol(s) are generated, the user chooses whether to create a new connection point or modify an existing connection point. See S3. If the user chooses to modify an existing connection point, the program branches to step S6 where the operator enters data identifying the connection point positioning symbol to modify, for example connection point positioning symbol 10a in FIG. 2C. The user can now choose to edit or delete the connection point positioning symbol. See step S8.

The location and angle of the connection point positioning symbol may be specified by the operator by graphically moving or rotating the connection point positioning symbol via a pointing device or numerically via keyboard entry. See step S10. To modify the connection point positioning symbol, for example to accommodate a desired horizontal orientation of the symbol to which symbol 2 is connected via connector 18a, the operator selects connection point positioning symbol 10a and rotates it to a new angle 4b, as shown in FIG. 2E. The modified connection point positioning symbol is shown as 10b in FIG. 2E.

Figure 5B:
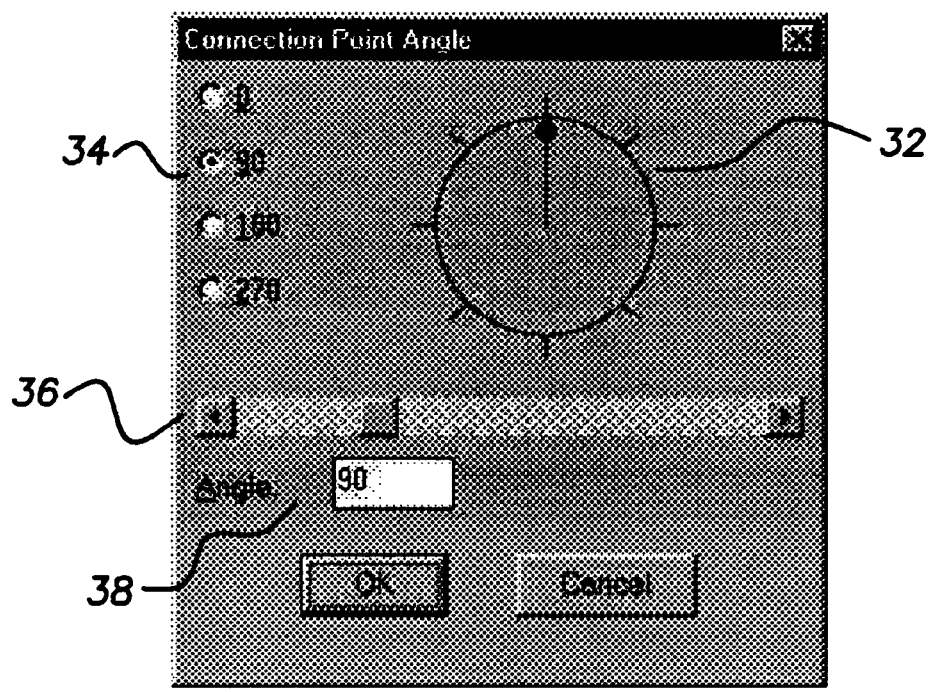
FIG. 5B shows a graphical window for displaying and editing a connection point angle.
Figure 5A:
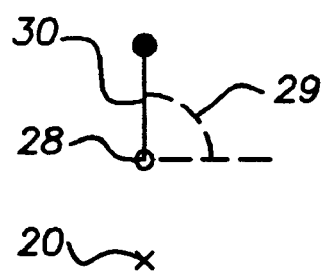
FIG. 5A shows an alternative embodiment in which the connection point location is displaced from the symbol.

In the preferred embodiment just described, the connection point positioning symbol is displayed at the connection point. However, the point at which the connection point positioning symbol is displayed and hence the point about which the connection point positioning symbol rotates need not coincide exactly with the point which defines the connection point location. The connection point positioning symbol may be displaced from the connection point. In this alternative embodiment of the invention, two related symbols are used which together define the connection point location and angle. As shown in FIG. 5A, the connection point positioning symbol is split into location symbol 20 which defines the connection point location and angle symbol 30 which rotates about point 28 to define angle 29. The angle connection point positioning symbol can be displayed to the operator anywhere, including in a separate window or control panel such as shown in FIG. 5B. The angle of the connection point can be displayed and adjusted using a dial 32, slider 36, or other methods. Radio button 34, numerical 38 or other entry methods may also be used.

Figure 4:
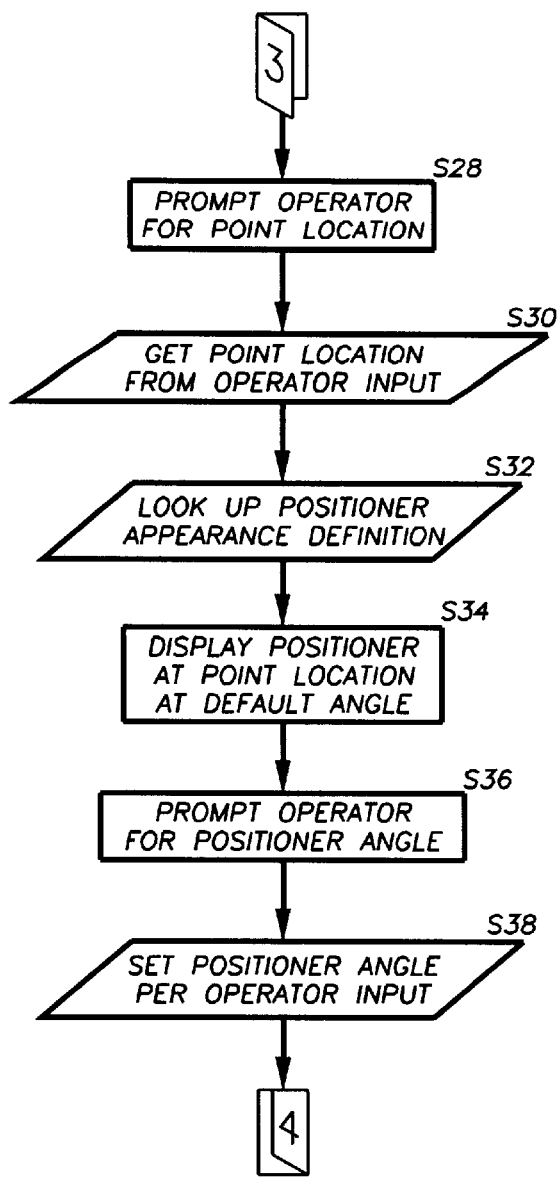
FIG. 4 is a flow chart which shows the preferred method for placing a connection point positioning symbol to define a new connection point for an intelligent symbol.

If, at step S3 of FIG. 1, the operator chose to create a new connection point rather than modify an existing one, the program branches to step S28 in FIG. 4—a flow chart of a method to create a new connection point positioning symbol at an operator specified location and angle. At step S28 in FIG. 4, the operator is prompted for a location for the new connection point. The operator inputs the connection point location 7 (see FIG. 2E) at step S30. At step S32, the appearance of the connection point positioning symbol is retrieved from the software application data. A new connection point positioning symbol 11 is displayed at point 7 at a default angle (not shown). The operator is prompted at step S36 for an angle and orients connection point positioning symbol 11 to angle 25 at step S38 by selecting the connection point positioning symbol and rotating it about point 7 until it is in the desired, preferably orthogonal, orientation.

The program allows the operator to continue to add or modify connection points until all connection points on the symbol have been satisfactorily processed. See step S12 of FIG. 1.

If the alternative method of displaying a single connection point positioning symbol only during the editing of a particular connection point is employed, the location and angle of the displayed connection point positioning symbol associated with a connection point are stored as computer data and the connection point positioning symbol is hidden prior to the next editing operation.

When the operator is satisfied, the symbol is closed for editing at step S14.

At step S11 the newly created connection point location 7 and angle 25 are determined from connection point positioning symbol 11 and added to the computer definition of symbol 2. At step S13 the angle 4b of connection point positioning symbol 10b for modified connection point 9 is determined and added to the computer definition of symbol 2. At step S16, any connection point which had its connection point positioning symbol deleted by the operator at step S8 is removed from the computer definition of its respective symbol. At step S17 the connection point positioning symbols are hidden and the operator can continue to edit the intelligent diagram.

In FIG. 2F, connector 18b will now be joined to symbol 2. Connector 18b connects at the new angle 4b and a location determined by connection point positioning symbol 10b in FIG. 2E.

New connector 26 (see FIG. 2F) will connect to symbol 2 at connection point 7 at angle 25 of new connection point positioning symbol 11 as shown in FIG. 2E.

I claim:

1. For use in a computer aided design system, a method of defining an intelligent symbol, comprising the steps of:
    defining a computer-generated symbol comprising a graphical entity and a connection point having a position in relation to a reference point;
    defining a connection point positioning symbol associated with the computer-generated symbol, the connection point positioning symbol having a location and an angle;
    generating coordinates of the location of the connection point positioning symbol, the coordinates describing the position of the connection point in relation to a reference point;
    generating an angle of the connection point positioning symbol, the angle describing a direction of the connection point in relation to a reference angle, the angle being variable in relation to the reference angle;
    building a symbol definition for the computer-generated symbol, the symbol definition comprising the coordinates of the location of the connection point positioning symbol and the angle of the connection point positioning symbol;
    rotating the connection point positioning symbol, thereby varying the angle and the direction of the connection point in relation to the reference angle;
    revising the symbol definition for the computer-generated symbol in accordance with the angle.

2. The method of claim 1 further comprising the step of generating a connector, the connector joining the computer-generated symbol at the angle and the location of the connection point positioning symbol.

3. The method of claim 1 further comprising the steps of:
    displaying the connection point positioning symbol;
    editing the connection point positioning symbol; and
    hiding the connection point positioning symbol.

4. The method of claim 1 further comprising the steps of:
    displaying the connection point positioning symbol;
    hiding the connection point positioning symbol after the step of generating coordinates of the location of the connection point positioning symbol.

5. The method of claim 1 wherein the reference angle is a reference angle within the computer-generated symbol.

6. The method of claim 1 further comprising displaying the connection point positioning symbol at the connection point.

7. The method of claim 1 further comprising the step of displaying the connection point positioning symbol at a postion displaced from the connection point.

8. The method of claim 1 further comprising the step of displaying the connection point positioning symbol in a graphic panel displaced from the connection point.

9. The method of claim 1 further comprising the steps of:
    editing the symbol definition for the computer-generated symbol by changing the coordinates of the location of the connection point positioning symbol and the angle of the connection point positioning symbol.

10. The method of claim 9 wherein the step of editing comprises the step of displaying the connection point positioning symbol.

11. The method of claim 1 further comprising step of deleting the connection point by deleting the connection point positioning symbol.

12. The method of claim 1 further comprising the steps of:
    specifying a new connection point by defining a new connection point positioning symbol;
    placing a new connector at a point on the computer-generated symbol, the new connector comprising a new position and a new angle determined by the new connection point positioning symbol.

13. The method of claim 12 further comprising the steps of adding the new connection point positioning symbol to the symbol definition for the computer-generated symbol by adding the new position and the new angle to the symbol definition.

14. The method of claim 1 wherein the connection point positioning symbol comprises a first end and a second end, the second end comprising a dot.

15. The method of claim 1 wherein the connection point positioning symbol comprises a line and a dot.

16. For use in a computer aided design system, a method of defining an intelligent symbol, comprising the steps of:
    defining a computer generated symbol comprising a graphical entity and a plurality of connection points, each of the connection points having a position in relation to a reference point;
    for each of the plurality of connection points, defining a connection point positioning symbol associated with the computer generated symbol, the connection point positioning symbol having a location and an angle, thereby defining a plurality of positioning symbols;
    for each one of the plurality of connection point positioning symbols, generating coordinates of the location of that one connection point positioning symbol, the coordinates describing the position of the connection point of that one connection point positioning symbol in relation to a reference point;

for each one of the plurality of connection point positioning symbols, generating a direction of that one connection point positioning symbol in relation to a reference angle;

building a symbol definition for the computer-generated symbol, the symbol definition comprising the coordinates of the locations of each of the plurality of connection point positioning symbols and the angles of the plurality of connection point positioning symbols;

moving one of the plurality of connection point positioning symbols relative to the computer generated symbol thereby varying the angle describing the direction of the one of the plurality of connection point positioning symbols in relation to the reference angle;

updating the symbol definition in accordance with the varied angle.

17. The method of claim 16 further comprising the step of displaying the plurality of connection point positioning symbols simultaneously.

18. The method of claim 16 further comprising the step of displaying the plurality of connection point positioning symbols one connection point positioning symbol at a time.

19. For use in a computer aided design system, a method of editing an intelligent symbol, comprising the steps of:

defining a computer-generated symbol comprising a graphical entity and a connection point having a position in relation to a reference point;

defining a connection point positioning symbol associated with the computer-generated symbol, the connection point positioning symbol having a location and an angle, wherein the location and the angle are indicative of the location and angle of a connector connected to the connection point;

displaying the connection point positioning symbol;

editing the connection point positioning symbol by changing the location or the angle.

20. The method of claim 19 further comprising the step of hiding the connection point positioning symbol following the step of editing.

21. The method of claim 19 further comprising the steps of generating a connector for connecting the computer-generated symbol to an entity, the connector joining the computer-generated symbol at the location and the angle of the connection point positioning symbol.

22. For use in a computer aided design system, a method of manipulating connections to a first computer-generated symbol, the symbol comprising at least one point for connection to a second computer-generated symbol, the method comprising the steps of:

generating a connection point positioning symbol for visual display, the connection point positioning symbol being provided with an indicator part and a manipulator part, wherein the indicator part indicates a direction of connection of the point for connection to the second computer-generated symbol, and wherein the manipulator part is linked to the point for connection to the second computer-generated symbol such that moving the manipulator part manipulates the point for connection to the second computer-generated symbol;

displaying the connection point positioning symbol;

changing the direction of connection of the point for connection to the second computer-generated symbol by rotating the manipulator part relative to the first computer-generated symbol, thereby changing the direction of connection of the point for connection to the second computer-generated symbol.

23. The method of claim 22 wherein the step of generating the connection point positioning symbol comprises the step of generating coordinates indicative of a location of the point for connection to the second symbol.

24. The method of claim 22 wherein the step of changing the direction of connection of the point for connection to the second symbol comprises rotating the manipulator part.

25. The method of claim 22 further comprising the step of selectively displaying and hiding the connection point positioning symbol.

26. The method of claim 22 wherein the step of changing the direction of connection of the point for connection to the second symbol comprises selecting the manipulator part by means of a pointing device.

27. The method of claim 22 wherein the manipulator part comprises a stick-like part.

28. The method of claim 22 wherein the manipulator part comprises a stick-like part, the stick-like part having an enlarged end.

29. The method of claim 22 wherein the indicator part is located proximate to the point for connection to the second symbol.

30. The method of claim 22 wherein the indicator part is located displaced from the point for connection to the second symbol.

31. The method of claim 22 wherein the indicator part is connected to the point for connection to the second symbol.

* * * * *